United States Patent
Wilhelm et al.

(10) Patent No.: US 10,144,458 B2
(45) Date of Patent: Dec. 4, 2018

(54) CONNECTION ARRANGEMENT BETWEEN A FIBER-PLASTIC COMPOSITE PROFILED PART AND A VEHICLE BODY FRAME PART AND METHOD FOR PRODUCING SAME

(71) Applicant: Bayerische Motoren Werke Aktiengesellschaft, Munich (DE)

(72) Inventors: Maximilian Wilhelm, Bockhorn (DE); Andreas Forster, Oberviechtach (DE); Julia Wagner, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/299,503

(22) Filed: Oct. 21, 2016

(65) Prior Publication Data
US 2017/0080985 A1 Mar. 23, 2017

Related U.S. Application Data

(63) Continuation of application No. PCT/EP2015/065654, filed on Jul. 9, 2015.

(30) Foreign Application Priority Data

Jul. 29, 2014 (DE) .................. 10 2014 214 846

(51) Int. Cl.
*B62D 29/00* (2006.01)
*B62D 25/06* (2006.01)
(Continued)

(52) U.S. Cl.
CPC ........... *B62D 29/005* (2013.01); *B62D 25/06* (2013.01); *B62D 27/026* (2013.01); *B62D 27/065* (2013.01); *B62D 65/024* (2013.01)

(58) Field of Classification Search
CPC .. B62D 29/005; B62D 65/024; B62D 27/026; B62D 27/065; B62D 25/06
(Continued)

(56) References Cited

U.S. PATENT DOCUMENTS 7,077,438 B2 * 7/2006 Albers .................. B60J 5/0447
293/102
2008/0296164 A1 * 12/2008 Dajek .................. B62D 29/002
205/80
(Continued)

FOREIGN PATENT DOCUMENTS

CN 103261004 A 8/2013
DE 44 23 642 C1 10/1995
(Continued)

OTHER PUBLICATIONS

Chinese-language Office Action issued in counterpart Chinese Application No. 201580020899.6 dated Dec. 5, 2017 with English translation (Sixteen (16) pages).
(Continued)

*Primary Examiner* — Joseph D. Pape
*Assistant Examiner* — Dana D Ivey
(74) *Attorney, Agent, or Firm* — Crowell & Moring LLP

(57) ABSTRACT

A connection arrangement is provided between a fiber-plastic composite profiled part and a vehicle body frame part. An intermediate piece is connected to the vehicle body frame part. The intermediate piece has a connection portion which is plug-connected and adhesively bonded to an end of the fiber-plastic composite profiled part. The end of the fiber-plastic composite profiled part is plugged onto the connection portion of the intermediate piece and is adhesively bonded on the inner surface to the connection portion.

12 Claims, 2 Drawing Sheets

(51) Int. Cl.
*B62D 65/02* (2006.01)
*B62D 27/02* (2006.01)
*B62D 27/06* (2006.01)

(58) Field of Classification Search
USPC .......................................................... 296/29
See application file for complete search history.

(56) References Cited

U.S. PATENT DOCUMENTS

| | | |
|---|---|---|
| 2013/0330124 A1 | 12/2013 | Haegele et al. |
| 2014/0183895 A1 | 7/2014 | Awano |
| 2016/0046169 A1 | 2/2016 | Zak et al. |

FOREIGN PATENT DOCUMENTS

| | | |
|---|---|---|
| DE | 198 47 866 A1 | 4/2000 |
| DE | 10 2010 053 843 A1 | 6/2012 |
| DE | 10 2012 016 666 A1 | 1/2013 |
| DE | 10 2012 207 901 A1 | 11/2013 |
| DE | 10 2013 002 365 B3 | 1/2014 |
| DE | 10 2012 215 905 A1 | 5/2014 |
| DE | 10 2012 112 313 A1 | 6/2014 |
| DE | 10 2013 010 332 A1 | 6/2014 |
| DE | 10 2013 227 185 A1 | 7/2014 |
| EP | 1 454 820 A1 | 9/2004 |
| WO | WO 2012/076074 A1 | 6/2012 |
| WO | WO 2014/177266 A1 | 11/2014 |

OTHER PUBLICATIONS

German-language Search Report issued in counterpart German Application No. 10 2014 214 846.4 dated Feb. 23, 2015 with English translation (11 pages).
International Search Report (PCT/ISA/210) issued in PCT Application No. PCT/EP2015/065654 dated Sep. 7, 2016 with English translation (5 pages).
German-language Written Opinion (PCT/ISA/237) issued in PCT Application No. PCT/EP2015/065654 dated Sep. 7, 2015 (4 pages).

\* cited by examiner

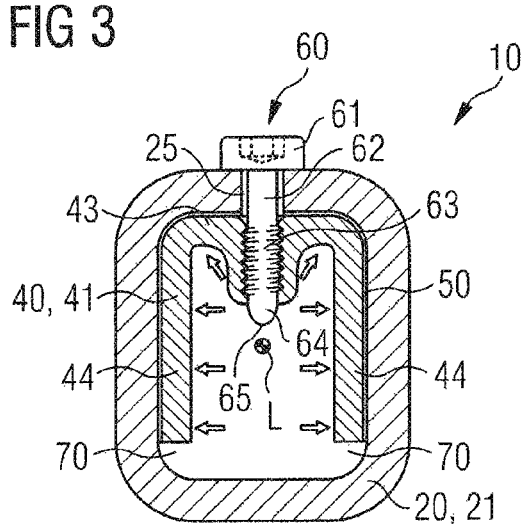
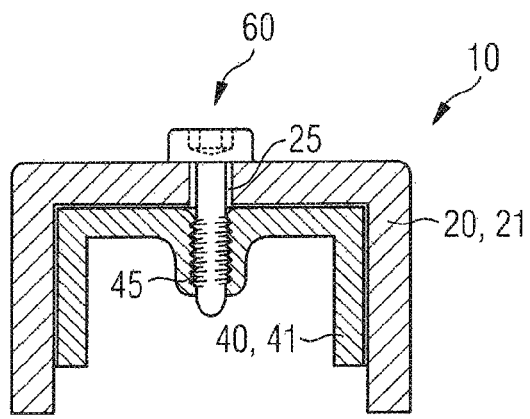
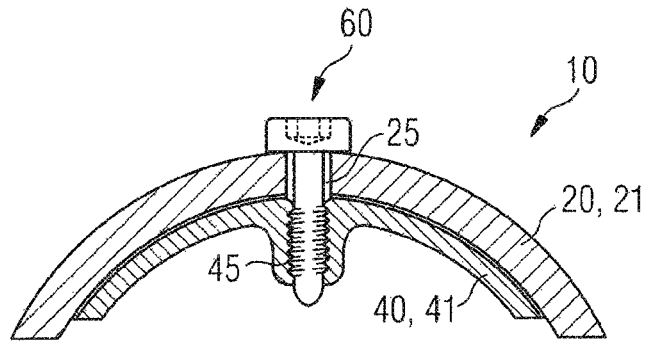

CONNECTION ARRANGEMENT BETWEEN A FIBER-PLASTIC COMPOSITE PROFILED PART AND A VEHICLE BODY FRAME PART AND METHOD FOR PRODUCING SAME

CROSS REFERENCE TO RELATED APPLICATIONS

This application is a continuation of PCT International Application No. PCT/EP2015/065654, filed Jul. 9, 2015, which claims priority under 35 U.S.C. § 119 from German Patent Application No. 10 2014 214 846.4, filed Jul. 29, 2014, the entire disclosures of which are herein expressly incorporated by reference.

BACKGROUND AND SUMMARY OF THE INVENTION

The invention relates to a connection arrangement between a fiber-plastic composite profiled part and a vehicle body frame part.

The invention furthermore relates to a method for producing such a connection arrangement and to a preferred use in motor vehicle manufacturing.

In motor vehicle manufacturing and, in particular, in vehicle body manufacturing, use is increasingly made of lightweight construction materials. These also include fiber-plastic composites, such as, for example, CFRP and GFRP. In addition to flat components, use is increasingly also being made of profiled components formed from a fiber-plastic composite (FPC) (referred to below as fiber-plastic composite profiled parts). Diverse connection arrangements for the insertion or attachment of a fiber-plastic composite profiled part into or to a vehicle body frame structure are known from the prior art. Regarding the prior art, reference is made to patent documents DE 10 2013 002 365 B3, DE 10 2012 112 313 A1 and DE 10 2010 053 843 A1.

The invention is based on the object of providing a connection arrangement of the relevant type which does not have at least one disadvantage associated with the prior art or has said disadvantage at least only to a reduced extent.

This and other objects are achieved by a connection arrangement, a method for producing the connection arrangement, and a preferred use of the connection arrangement according to embodiments of the invention.

A connection arrangement according to the invention between a fiber-plastic composite profiled part and a vehicle body frame part comprises a connector in the form of an intermediate piece which is connected to the vehicle body frame part and has a connection portion which is plug-connected and adhesively bonded to an end of the fiber-plastic composite profiled part, wherein the end of the fiber-plastic composite profiled part is plugged onto the connection portion of the intermediate piece and is adhesively bonded on the inner surface, i.e. on the inner circumferential surface thereof, to the connection portion.

The fiber-plastic composite profiled part and the vehicle body frame part also, in particular, belong to the connection arrangement according to the invention. To this extent, a connection arrangement according to the invention could also be referred to as a component composite.

Unlike the connection arrangements known from the prior art, the intermediate piece, which may also be referred to as attachment piece or adapter, is not plugged with its connection portion or plug-in connection portion onto the end of the fiber-plastic composite profiled part, but rather into same, for which purpose the intermediate piece or the connection portion thereof is correspondingly designed. The adhesive connection exists between the surface portions, which lie flush against one another in an overlapping region, on the outer side or outer circumferential surface of the plugged-in connection portion and the inner side or inner circumferential surface at the open end of the plugged-on fiber-plastic composite profiled part. These surface portions may also be referred to as adhesive surfaces. The direct adhesive connection between the joining partners is thereby very readily protected against external effects. In addition, a highly attractive appearance is produced. Furthermore, advantages arise in the case of the adhesive joining, as is explained in more detail below.

The intermediate piece is preferably formed from a metallic material, preferably from an aluminum or steel material. The intermediate piece can be a forged part, sheet-metal shaped part or cast part, in particular a die cast part. Similarly, the intermediate piece can also be a profiled part formed in particular from aluminum or steel material. It is preferably a continuously cast or extruded profiled part which is cut to size and can be designed, for example, as an open profile (for example as a U profile) or as a closed hollow profile or tubular profile. The intermediate piece is preferably produced integrally (i.e. in one piece), wherein a multi-piece configuration (for example as a welded part) is also possible.

The vehicle body frame part is, in particular, a sheet-metal shaped part, a cast part, a (metallic) profiled part or the like which is formed in particular from an aluminum or steel material. The vehicle body frame part is preferably a hot-formed and, in particular, press-hardened sheet-metal shaped part which accordingly has high material strength. The vehicle body frame part is preferably part of a motor vehicle body and is accordingly inserted into a primary vehicle body structure or vehicle body frame structure. The intermediate piece can be joined in an integrally bonded and/or form-fitting manner to the vehicle body frame part, for example by welding, screwing, riveting or the like, for which purpose the intermediate piece is preferably formed with a suitable connection portion, for example in the form of a welding, screwing or riveting flange. An integral formation of the intermediate piece with the vehicle body frame part is also possible, for example in such a manner that the intermediate piece is integrally formed directly on the vehicle body frame part by forming or primary forming.

The fiber-plastic composite profiled part can be designed as an open profile (or as what is referred to as a half profile), for example as a U profile. The fiber-plastic composite profiled part is preferably designed as a tubular hollow profile (or as what is referred to as a full profile). The fiber-plastic composite profiled part can have a three-dimensional shaping and can be curved or shaped in some other way along its axial longitudinal extent, for example. The fiber-plastic composite profiled part is preferably designed with constant cross sections along its axial longitudinal extent.

It is preferably provided that the outer cross section of the connection section of the intermediate piece does not fully correspond with the inner cross section of a fiber-plastic composite profiled part, designed in particular as a hollow profile, as the result of which, outside the surface portions (on the outer circumferential surface of the plugged-in connection portion and on the inner circumferential surface at the end of the plugged-on fiber-plastic composite profiled part) which lie flush against one another in the overlapping region and are also at least partially adhesively bonded to one another, there are free-running zones or clearances which permit different thermal expansions of the intermediate piece or of the connection portion thereof and of the fiber-plastic composite profiled part transversely with respect to the longitudinal direction or plug-on direction.

The connection portion of the intermediate piece can be designed with at least one plug-in slope or introduction slope which permits simple and damage-free insertion into the open end of the fiber-plastic composite profiled part or plugging of the fiber-plastic composite profiled part onto the connection portion of the intermediate piece. A plug-in slope can be formed, for example, by sharpening or beveling the connection portion of the intermediate piece.

In a particularly preferred development of the invention, the plugged-on fiber-plastic composite profiled part is secured or tightly screwed with at least one flow-hole-forming screw to the connection portion of the intermediate piece. The connection between the fiber-plastic composite profiled part and the intermediate piece therefore takes place by adhesive bonding and by screwing to the end plugged onto the intermediate piece by use of at least one flow-hole-forming screw or flow hole screw screwed in in the overlapping region.

The flow-hole-forming screw which is used preferably has a screw head and a screw shank, wherein the screw shank is formed with a self-forming threaded portion and a flow-hole-forming portion arranged upstream thereof. Flow-hole-forming screws of this type are known from the prior art (see, for example, DE 39 09 725 C1), but have not been used until now for the purpose mentioned. This development of the invention therefore also extends to the new use of at least one flow-hole-forming screw for a corresponding connection arrangement and/or for producing a corresponding connection arrangement.

In an advantageous manner, the use of a flow-hole-forming screw permits non-cutting direct joining without pre-punching or other preparation of the intermediate piece and, in particular, also without pre-punching of the fiber-plastic composite profiled part. As a result, in particular in comparison to other mechanical joining means and joining methods (such as, for example, riveting or conventional screwing), outlays are reduced and cycle times reduced during the production of a connection arrangement according to the invention. Considerable cost advantages are therefore achievable especially in series manufacturing. In addition, a joining or screw connection produced with a flow-hole-forming screw can be subjected to a very high load and is releasable again (for example for carrying out repairs). In addition, the screwing-in of a flow-hole-forming screw can be automated very readily. Furthermore, advantages are also afforded in respect of the corrosion tendency. This is not an exhaustive list of the advantages which are associated with the use of flow-hole-forming screws.

The method according to the invention for producing a connection arrangement according to the invention comprises at least the following acts:

providing a fiber-plastic composite profiled part and an intermediate piece which is formed in particular from metal and has a connection portion, wherein the fiber-plastic composite profiled part and the intermediate piece can be designed in accordance with the explanations above and/or below and wherein it is provided in particular that the intermediate piece is already connected to a vehicle body frame part;

applying an adhesive (wherein it is, in particular, what is referred to as a structural adhesive) to the relevant surface portions (i.e. to the corresponding adhesive surfaces in an overlapping region to be produced) on the outer circumferential surface of the connection portion of the intermediate piece and/or on the inner circumferential surface at the open end of the fiber-plastic composite profiled part;

optionally slightly curing the adhesive;

plug-connecting the intermediate piece to the fiber-plastic composite profiled part by plugging the connection portion into the open end of the fiber-plastic composite profiled part or by plugging the fiber-plastic composite profiled part onto the connection portion of the intermediate piece, wherein, after the plugging-in or plugging-on, a large compensation of tolerances in the plug-on direction or longitudinal direction of the profiled part is made possible; and carrying out a heat treatment in order to cure the adhesive, wherein the surface portions or adhesive surfaces which lie flush against one another in the overlapping region and are provided with adhesive are pressed against one another because of the relatively great thermal expansion of the intermediate piece formed in particular from metal.

Accordingly, the method according to the invention makes use of the circumstance, which is disadvantageous per se, that the metal material of the intermediate piece has a higher or more pronounced thermal expansion upon heating than the fiber-plastic composite material of the profiled part. By the end of the fiber-plastic composite profiled part being plugged onto the connection portion of the metallic intermediate piece, the intermediate piece is pressed virtually from the inside against the inner circumferential surface of the fiber-plastic composite profiled part at the adhesive surfaces or contact surfaces in the overlapping region upon heating, thus producing a particularly intimate and firm adhesive connection. The above-explained free-running zones have also proven particularly advantageous here, as a result of which critical material stresses can be prevented during the heat treatment.

The heat treatment can be carried out, for example, by use of a furnace or an inductive heating system. The heat treatment and the curing of the adhesive preferably take place in a drying cycle following cathodic dip coating, i.e. within the scope of a CDC process.

It is preferably provided that the fiber-plastic composite profiled part is tightly screwed with at least one flow-hole-forming screw to the intermediate piece after the plug-connection and prior to the heat treatment, wherein the tight screwing preferably takes place without pre-punching of the intermediate piece and, in particular, also without pre-punching of the fiber-plastic composite profiled part (what is referred to as direct screwing). For this purpose, reference is made in particular also to the explanations above in this regard. The placing or screwing-in of the flow-hole-forming screw preferably takes place in an automated manner. The placing of at least one flow-hole-forming screw serves, in particular, also for the temporary securing of the joining partners until the adhesive has cured.

A connection arrangement according to the invention is preferably used on a motor vehicle body for the attachment of a roof bow in the form of a fiber-plastic composite profiled part to a roof frame. The fiber-plastic composite profiled part forming the roof bow can be designed in accordance with the explanations above and/or below. The intermediate piece belonging to the connection arrangement can be welded, screwed, riveted or connected in another suitable manner to the roof frame. Particularly preferably, it is provided that the intermediate piece is formed integrally with a vehicle body frame part (for example a roof longitudinal member or the like) forming the roof frame or belonging to the roof frame. The vehicle body frame part is preferably a heat-formed and, in particular, press-hardened sheet-metal shaped part.

The invention therefore extends, at least indirectly, also to a motor vehicle body and/or to a vehicle body frame structure with at least one roof bow which is designed as a fiber-plastic composite profiled part and is fastened at least on one side and, in particular, on both sides, i.e. at both of its axial ends, to a roof frame or the like by way of a connection arrangement according to the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is another sectional view of the same connection arrangement.

FIGS. 4a and 4b are sectional views corresponding to FIG. 3 of two further embodiment possibilities of connection arrangements according to the invention.

DETAILED DESCRIPTION OF THE DRAWINGS

Figure 1:
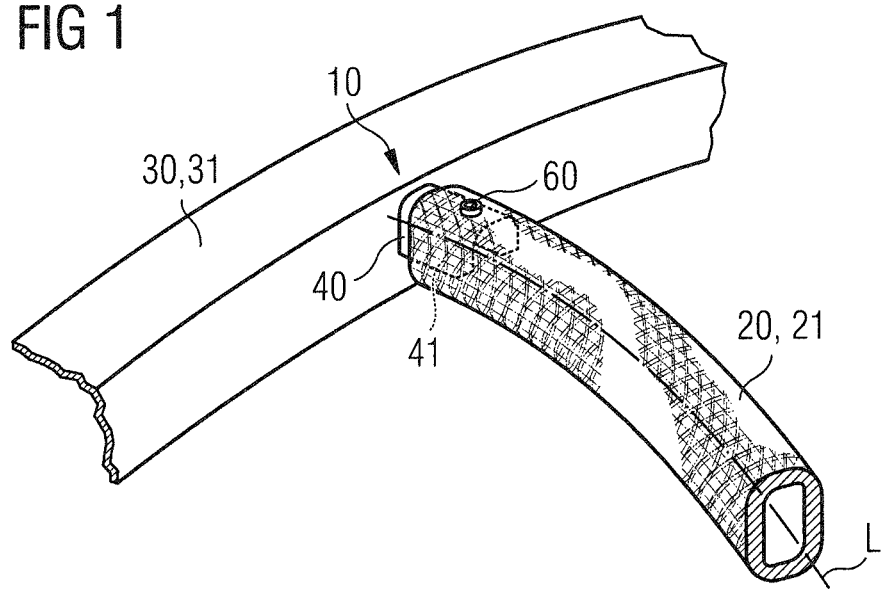
FIG. 1 is a perspective view of part of a roof bow which is formed from a fiber-plastic composite profile and is attached to a roof frame of the vehicle body by way of a connection arrangement according to an embodiment of the invention.

FIG. 1 shows a connection arrangement 10 between a three-dimensionally shaped roof bow 20 and a three-dimensionally shaped roof frame 30 on a vehicle body (not illustrated further). The roof bow 20 is designed as a tubular fiber-plastic composite hollow profiled part 21. The closed, approximately rectangular cross section of the fiber-plastic composite profiled part 21 is merely by way of example. The fiber-plastic composite profiled part 21 could also have, for example, a closed circular or oval cross section or could be formed with an open cross section (as shown, for example, in FIGS. 4a, 4b). The vehicle body frame part 31 forming the roof frame 30 is a hot-formed and, in particular, press-hardened steel sheet-metal shaped part. At its other end, the roof bow 20 can be attached to a roof frame 30 or vehicle body frame part 31 in the same manner by way of such a connection arrangement 10.

Figure 2:
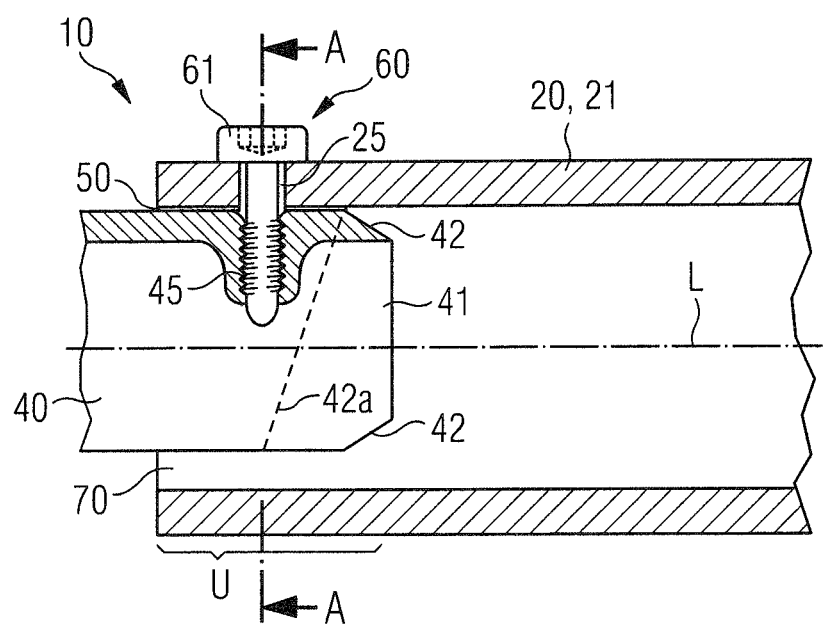
FIG. 2 is a sectional view of the connection arrangement from FIG. 1.

The connection arrangement 10 includes a metallic intermediate piece 40. The intermediate piece 40 has a connection portion 41 which is plugged into the open end of the fiber-plastic composite profiled part 21 or onto which connection portion the fiber-plastic composite profiled part 21 is plugged with its open end, as shown in FIG. 2. In the overlapping region U, the fiber-plastic composite profiled part 21 is adhesively bonded on the inner surface with its surface portions lying flush against the plug-in connection portion 41 to the intermediate piece 40. The flat adhesive bonding takes place in particular by use of structural adhesive 50 which is located between the corresponding adhesive surfaces.

The intermediate piece 40 is designed as a profiled part, wherein this is an open U profile, as can be seen in FIG. 3. The use of an open profile enables weight to be saved. At its end facing away from the connection portion 41, the intermediate piece 40 is connected to the roof frame 30 or to the vehicle body frame part 31, for which purpose the intermediate piece 40 can have a connection flange (not shown in FIG. 2). Similarly, an integral design of the vehicle body frame part 31 with at least one, in particular integrally formed, intermediate piece 40 is also possible, as explained above. As is furthermore apparent from FIG. 2, the connection portion 41 of the intermediate piece 40 is formed with plug-in slopes 42. The dashed line 42a shows another possibility for the configuration of a plug-in slope.

In the overlapping region U, the fiber-plastic composite profiled part 21 is furthermore fastened with a flow-hole-forming screw 60 to the plugged-in connection portion 41 of the intermediate piece 40, i.e. it is tightly screwed thereto or screwed thereon. The flow-hole-forming screw 60 which is used has a screw head 61 and a screw shank 62, wherein the screw shank 62 is formed with a self-forming threaded portion 63 and a flow-hole-forming portion 64, including a blunt screw tip 65, arranged on a side of the threaded portion away from the screw head 61.

The flow-hole-forming screw 60 can be placed directly, i.e. without previous punching or other preparation of the intermediate piece 40. The fiber-plastic composite profiled part 21 has a pilot or preliminary hole 25 at the screwing-in point, wherein this may possibly also be omitted. Either way, there are advantageously no relative positions, which are predetermined by required overlappings of holes, between the intermediate piece 40 and the plugged-on fiber-plastic composite profiled part 21.

The flow-hole-forming screw 60 is pressed against the intermediate piece 40 or the central web 43 of the connection portion 41 through the hole 25 at the designated screwing-in point and set into rotation. As a result of the friction which arises, the screwing-in point is heated locally, which enables the metal material to be plasticized and thereupon to be plastically deformed in the radial direction and in the axial direction together with the flow-hole-forming portion 64 and finally to be penetrated. This forms an inwardly pointing flow hole 45 on the intermediate piece 40, in which flow hole the self-forming threaded portion 63 of the screw 60 subsequently engages, as a result of which a releasable force- and form-fitting connection is produced between the components or joining partners 20 and 40. The placing or screwing-in operation advantageously takes place without cutting. Furthermore, single-sided tool accessibility to the screwing-in point suffices. When the screw 60 is placed, the intermediate piece 40 is typically already fastened to the vehicle body frame part 31.

In an analogous manner, the screw fastening of the fiber-plastic composite profiled part 21 to the connection portion 41 of the intermediate piece 40 can also take place with a plurality of flow-hole-forming screws 60 which, arranged next to one another or one behind another (with respect to the longitudinal axis L), can be screwed into the central web 43 of the connection portion 41. According to the illustration in FIG. 3, the screws 60 can also be screwed in from a lateral direction through the limbs 44 of the connection portion 41 designed as a U profile.

As is very readily apparent from the sectional illustration of FIG. 3, the outer cross section of the connection portion 41, which is designed as a U profile, of the intermediate piece 40 does not completely or fully correspond with the inner cross section of the fiber-plastic composite profiled part 21, as a result of which, outside the surface portions lying flush against one another in the overlapping region U, there are free-running zones or clearances 70 which permit different thermal expansions in the cross section, i.e. transversely with respect to the longitudinal axis L (and therefore transversely with respect to the plugging-on or plugging-in direction).

According to the illustration in FIG. 3, the limbs 44 of the intermediate piece 40 can expand downward upon heating into the free-running zones 70, as a result of which account is taken in particular of the fact that the metallic intermediate piece 40 has greater thermal expansion than the fiber-plastic composite profiled part 21. The different thermal expansions are not prevented by the screw 60 screwed into the central web 43.

In order to produce the connection arrangement 10, first of all the adhesive 50 is applied to the relevant surface portions on the outer circumferential surface of the connection portion 41 of the intermediate piece 40 and/or to the inner circumferential surface at the open end of the fiber-plastic composite profiled part 21, wherein it is provided in particular that the intermediate piece 40 is already connected to the vehicle body frame part 31. The fiber-plastic composite profiled part 21 and the intermediate piece 40 are subsequently plug-connected. After at least one flow-hole-forming screw 60 is screwed in, the component assembly pre-secured in this way is subjected to a heat treatment in order to cure the adhesive 50, which takes place in particular over the course of a cathodic dip coating drying cycle. The surface portions or adhesive surfaces which lie flush against one another in the overlapping region U and are provided with adhesive 50 are pressed against one another here because of the greater thermal expansion of the metallic intermediate piece 40, as illustrated by the arrow in FIG. 3. In addition, the free-running zones 70 permit different thermal expansions, as a result of which critical material stresses can be prevented. Reference is furthermore made to the above detailed explanations.

FIG. 4 shows two different embodiments of connection arrangements 10 according to the invention, in which the roof bows 20 are designed as open fiber-plastic composite profiled parts. As in the embodiment possibility shown in FIGS. 1 to 3, the size and geometry ratios illustrated are only by way of example. Furthermore, the previous explanations regarding the embodiment possibility shown in FIGS. 1 to 3 apply analogously.

LIST OF REFERENCE SIGNS

10 Connection arrangement
20 Roof bow
21 Fiber-plastic composite profiled part
25 Perforation, preliminary hole
30 Roof frame
31 Vehicle body frame part
40 Intermediate piece
41 Connection portion
42 Plug-in slope
43 Profile central web
44 Profile limb
45 Flow hole
50 Adhesive
60 Flow-hole-forming screw
61 Screw head
62 Screw shank
63 Self-forming threaded portion
64 Flow-hole-forming portion
65 Screw tip
70 Free-running zone
L Longitudinal axis
U Overlapping region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connection arrangement between a fiber-plastic composite profiled part and a vehicle body frame part, comprising:
   an intermediate piece connected to the vehicle body frame part, wherein
   the intermediate piece has a connection portion which is plug-connected and adhesively bonded to an end of the fiber-plastic composite profiled part, and
   the end of the fiber-plastic composite profiled part is plugged onto the connection portion of the intermediate piece and is adhesively bonded on an inner surface to the connection portion, wherein
   the plugged-on fiber-plastic composite profiled part is tightly screwed with at least one flow-hole-forming screw to the connection portion of the intermediate piece.

2. The connection arrangement according to claim 1, wherein the fiber-plastic composite profiled part is configured as a tubular hollow profile.

3. The connection arrangement according to claim 2, wherein an outer cross section of the connection portion does not fully correspond with an inner cross section of the hollow profile, as a result of which, outside of surface portions lying flush against each other in an overlapping region, free-running zones are provided which permit different thermal expansions.

4. The connection arrangement according to claim 1, wherein the connection portion of the intermediate piece has at least one plug-in slope.

5. The connection arrangement according to claim 1, wherein the vehicle body frame part is a roof frame and the fiber-plastic composite profiled part is a roof bow of a motor vehicle.

6. The connection arrangement according to claim 5, wherein the intermediate piece is formed integrally with the roof frame.

7. A method for producing a connection arrangement between a fiber-plastic composite profiled part and a vehicle body frame part, the vehicle body frame part having an intermediate piece connected thereto, wherein the method comprises the acts of:
   applying an adhesive to surface portions on an outer circumferential surface of a connection portion of the intermediate piece and/or on an inner circumferential surface at an end of the fiber-plastic composite profiled part;
   plug-connecting the fiber-plastic composite profiled part to the intermediate piece; and
   carrying out a heat treatment in order to cure the adhesive, wherein the surface portions that lie flush one against another in an overlapping region of the fiber-plastic composite profiled part and the connection portion of the intermediate piece and are provided with the adhesive are pressed against one another due to a greater thermal expansion of the intermediate piece, wherein the act of carrying out the heat treatment in order to cure the adhesive takes place in a drying cycle following cathodic dip coating.

8. The method according to claim 7, further comprising the act of:
   tightly screwing the fiber-plastic composite profiled part to the intermediate piece prior to the heat treatment via at least one flow-hole-forming screw.

9. The method according to claim 8, wherein the act of tightly screwing via the at least one flow-hole-forming screw is carried out without pre-punching of the intermediate piece.

10. The method according to claim 9, wherein the act of tightly screwing via the at least one flow-hole-forming screw is carried out without pre-punching of the fiber-plastic composite profiled part.

11. The method according to claim 8, wherein the act of tightly screwing via the at least one flow-hole-forming screw is carried out without pre-punching of the intermediate piece.

12. The method according to claim 11, wherein the act of tightly screwing via the at least one flow-hole-forming screw is carried out without pre-punching of the fiber-plastic composite profiled part.

* * * * *